Sept. 30, 1941.  L. E. WHITTAKER  2,257,254

CINEMATOGRAPHIC APPARATUS

Filed Sept. 10, 1940  4 Sheets-Sheet 2

Inventor:
Lloyed E. Whittaker
by Roberts, Cushman & Woodberry
his Attys.

Sept. 30, 1941.     L. E. WHITTAKER     2,257,254
CINEMATOGRAPHIC APPARATUS
Filed Sept. 10, 1940     4 Sheets-Sheet 3
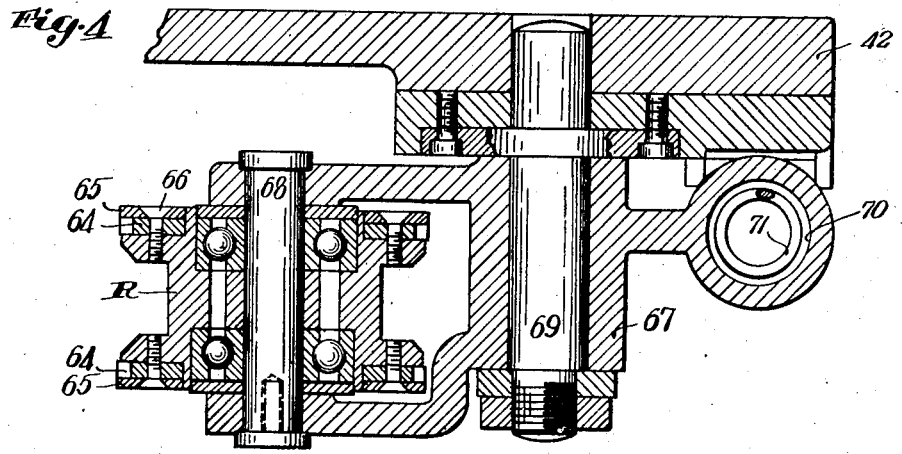
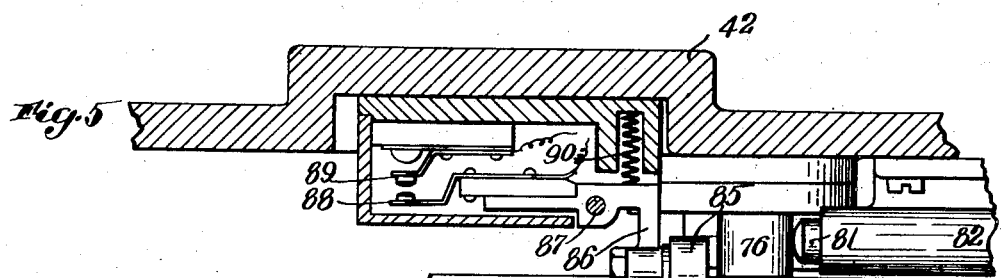
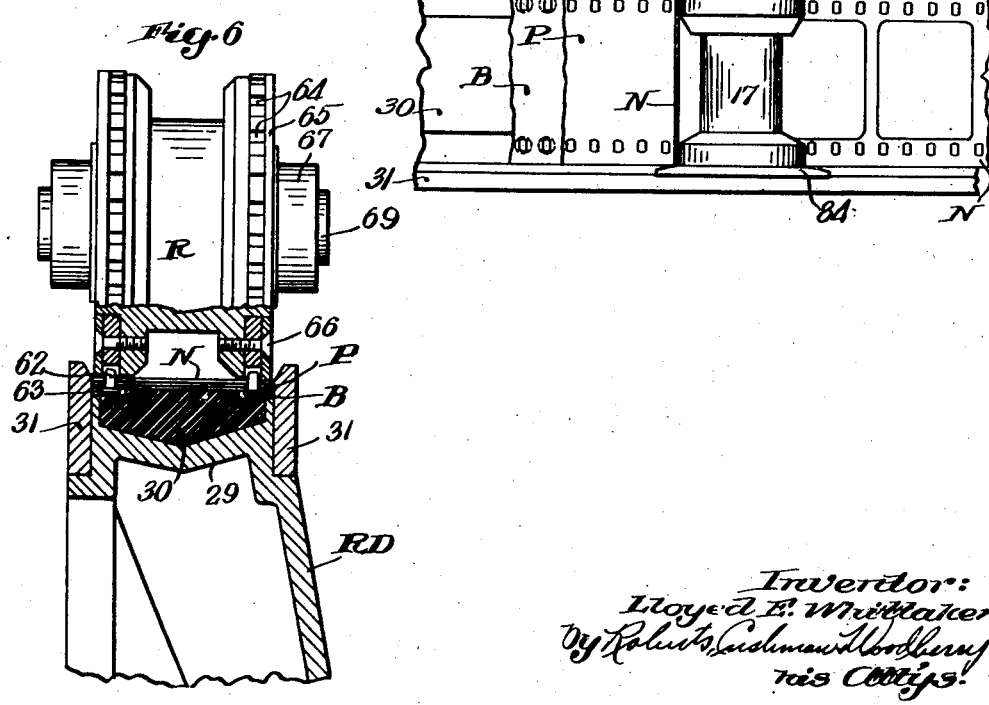
Inventor:
Lloyd E. Whittaker Sept. 30, 1941.    L. E. WHITTAKER    2,257,254
CINEMATOGRAPHIC APPARATUS
Filed Sept. 10, 1940    4 Sheets—Sheet 4
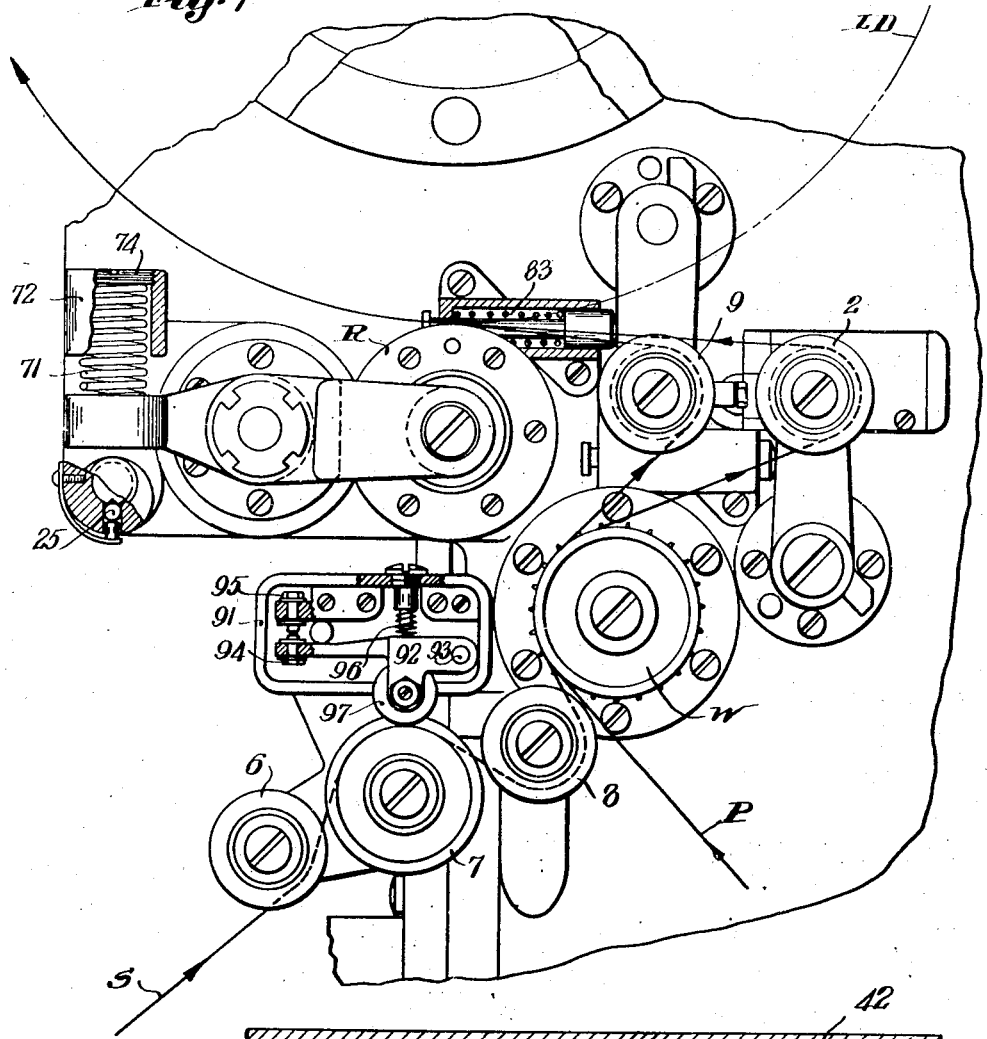
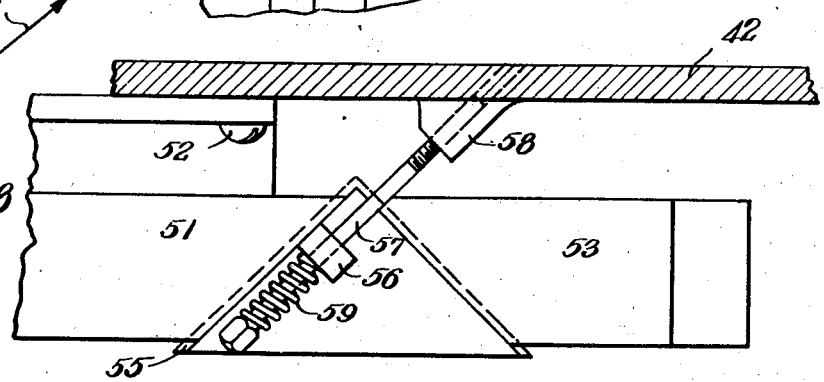
Inventor:
Lloyed E. Whittaker
by Roberts, Cushman & Woodberry
his Attys.

Patented Sept. 30, 1941

2,257,254

UNITED STATES PATENT OFFICE 2,257,254

CINEMATOGRAPHIC APPARATUS

Lloyed E. Whittaker, Los Angeles, Calif., assignor to Technicolor Motion Picture Corporation, Los Angeles, Calif., a corporation of Maine Application September 10, 1940, Serial No. 356,122

13 Claims. (Cl. 271—2.3)

This invention relates to cinematographic apparatus of the type having a film carrier provided with an endless series of teeth traveling in an orbital path, together with means for feeding film to and from the carrier at spaced points along the path, one example of such apparatus being disclosed in the co-pending application of Gerald F. Rackett, Serial No. 260,326, filed March 7, 1939, in which the carrier is in the form of a belt trained over a pair of aligned drums.

Objects of the present invention are to provide apparatus of the type referred to which feeds the film to and from the carrier smoothly and uniformly, which has substantially no tendency to damage the film as the film is moved on and off said teeth, which accommodates shrunken film and different films shrunken to different degrees, which operates uniformly throughout the length of a reel of film irrespective of the size of the reel, and which is generally superior to prior apparatus of the type referred to.

According to the present invention the carrier is driven by the film and the film is positively driven, by sprocket wheels or other suitable means, at points spaced from the carrier at opposite ends of the portions seated on the carrier, one wheel engaging the film as it approaches the carrier, and the other wheel engaging the film as it leaves the carrier. Thus the feed of the film, throughout the portion associated with the carrier, is constant and unaffected by the increasing diameter of the roll of film on the frictionally driven take-up reel. Preferably the pitch of the teeth on the carrier is slightly greater than the pitch of the sprocket holes and, as the film is moved on and off the teeth, the film is stretched to make the pitch of the sprocket holes approximately equal to or slightly greater than that of the teeth, thereby to cause the film to feed freely on and off the teeth.

For the purpose of illustration a typical embodiment of the invention is shown in the accompanying drawings in which—

Fig. 4 is a section on line 4—4 of Fig. 2;

Fig. 5 is a section on line 5—5 of Fig. 2;

Fig. 6 is a section on line 6—6 of Fig. 2;

Fig. 7 is a front elevation of the lower left-hand corner of the machine; and

Fig. 8 is a section on line 8—8 of Fig. 2.

Figure 1:
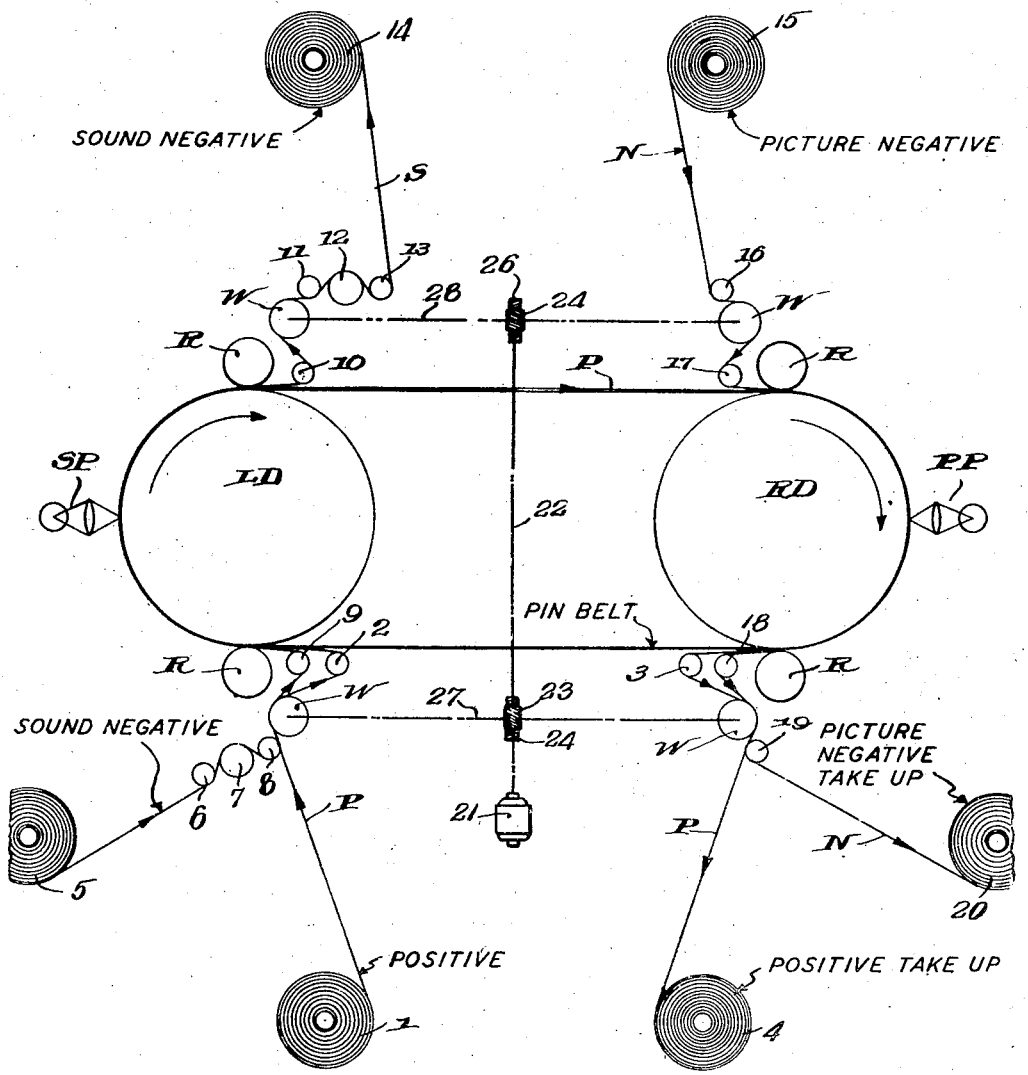
Fig. 1 is a diagrammatic view of the apparatus.

Referring to the diagram of Fig. 1, the particular embodiment of the invention chosen for the purpose of illustration comprises two drums, a left-hand LD and a right-hand drum RD, and a toothed belt B trained over the two drums. While apparatus according to the present invention may be utilized for many purposes, the illustrative embodiment comprises a printer for printing on positive film P from a sound negative S and a picture negative N, the three films feeding through the machine simultaneously and continuously. The positive P feeds from a supply reel 1 to a sprocket wheel W, thence to a tension roll 2 and a seating roll R, thence through an arc of 180° around the drum LD, thence under another seating roll R, thence along the upper straight stretch of the belt B from the drum LD to the drum RD, thence under the seating roll R, thence through an arc of 180° around the drum RD, and thence past the seating roll R, the tension roll 3, and the sprocket wheel W to the take-up reel 4. The sound negative S feeds from the take-up reel 5 past rolls 6, 7 and 8, sprocket wheel W, tension roll 9, seating roll R, drum LD, seating roll R, tension roll 10, sprocket wheel W, and rolls 11, 12 and 13 to the take-up reel 14. The picture negative feeds from the supply reel 15 over roll 16, sprocket wheel W, tension roll 17, seating roll R, right-hand drum RD, seating roll R, tension roll 18, sprocket wheel W and roll 19 to the take-up reel 20. As the two films P and S reach the belt B tangentially they are snugly pressed against each other and against the belt B with the teeth of the belt projecting through the sprocket holes of both films. Likewise when the picture negative N reaches the belt tangentially at the top of the drum RD the roll R seats the film snugly on the teeth of the belt in superposition with the positive film P. As indicated at SP the sound negative is printed on the positive as the two films S and P feed around the left-hand drum LD, and as indicated at PP the pictures are printed from the negative N on the positive P as the films N and P feed around the right-hand drum RD, printing apparatus suitable for use at these two printing stations being fully disclosed in the aforesaid co-pending application.

As also disclosed in said application the reels 1, 4, 5, 14, 15 and 20 may be provided with frictional driving and braking mechanism which is reversible so that, when the machine is running in the direction above described, the reels 4, 14 and 20 are frictionally driven to serve as take-up reels and the reels 1, 5 and 15 are frictionally braked to prevent over-running and, when the machine is reversed, the reels 1, 5 and 15 are frictionally driven and the reels 4, 14 and 20 are frictionally braked. As further disclosed in the aforesaid application the reel mechanism may be driven from the same source of power as the belt (the motor 21 in this case) so that the entire machine may be reversed merely by reversing the motor. Thus in printing one positive the negatives may be run through the machine in one direction and in printing the next positive the films may be run in the opposite direction, thereby avoiding the necessity of rewinding the negatives between successive printings. For this purpose the films would of course be provided with leaders which remain threaded through the machine at the end of each printing operation.

According to this invention the drums LD and RD are driven by the belt and the belt is driven by the films which in turn are driven by the four sprocket wheels W. These wheels are positively driven in synchronism in any suitable way as for example by a motor 21 and a vertical shaft whose axis is indicated by the broken line 22 and which carries two worms 23 and 24 meshing with worm wheels 25 and 26 on horizontal shafts whose axes are indicated at 27 and 28, the lower shaft driving the two lower sprocket wheels through suitable gearing not shown and the upper shaft driving the upper sprocket wheel through suitable gearing not shown.

Figure 2:
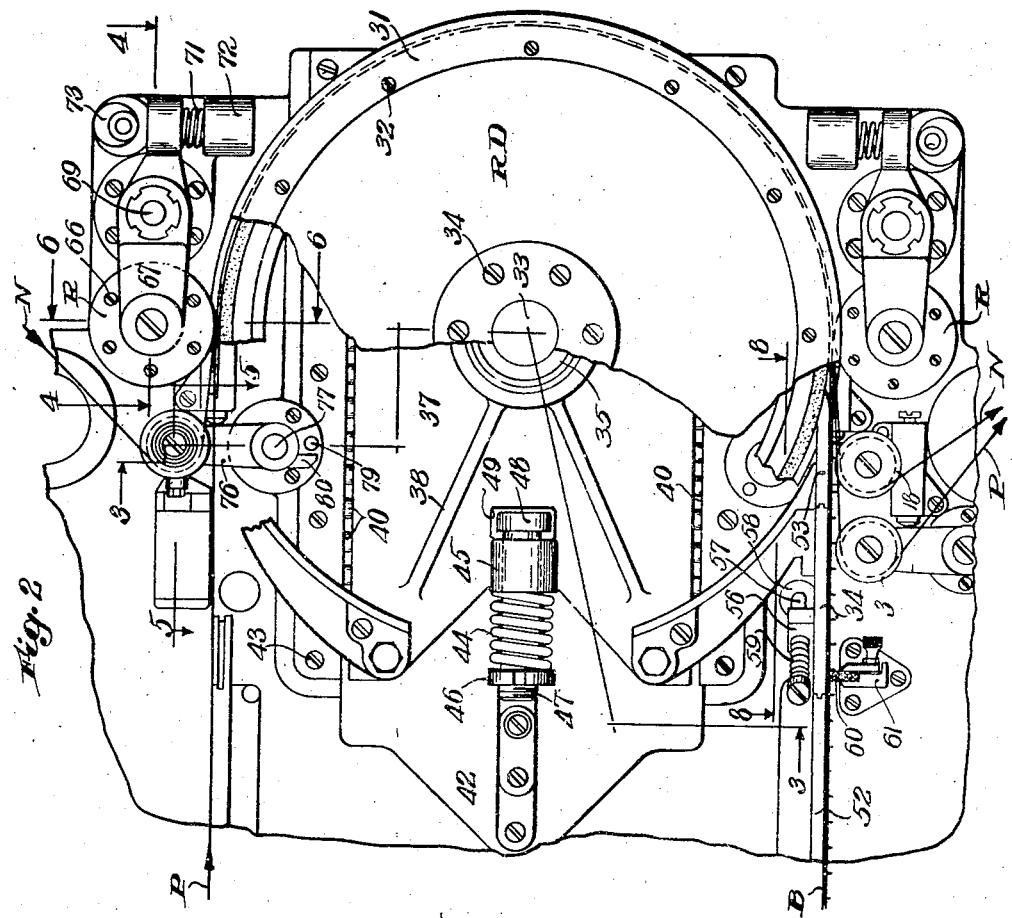
Fig. 2 is a front elevation of the right-hand end of the apparatus.
Figure 3:
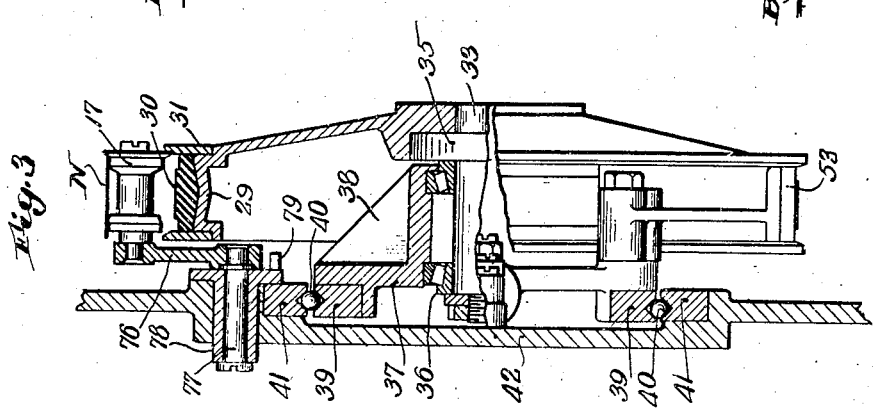
Fig. 3 is a section on line 3—3 of Fig. 2.

As shown in Figs. 2 and 3 the right-hand drum RD comprises a peripheral portion 29 carrying a ring 30 of medium hard rubber vulcanized on the drum with flanges 31 secured on opposite sides of the ring by means of screws 32. The drum RD is mounted on a shaft 33 by means of screws 34 extending into a collar 35 integral with the shaft. The shaft 33 is rotatably mounted, through the medium of roller bearings 36, on a mount 37 having strengthening ribs 38 and carrying two guide rails 39 which cooperate, through roller bearings 40, with parallel rails 41 fastened to the frame 42 by means of screws 43. Thus the mount 37 may move back and forth toward and from the left-hand drum LD. To hold the belt B taut the mount 37 is yieldingly urged to the right by means of a spring 44 interposed between a lug 45 on the mount 37 and a nut 46 threaded on the left-hand end of a rod 47 which, at its right-hand end, is fast to a lug 48 projecting forwardly from the back plate 42 through an opening 49 in the mount 37. By threading the nut 46 back and forth on the rod 47 the tension on the belt B may be adjusted.

As shown in Figs. 2 and 8 the belt B travels to the left from the right-hand drum RD to the left-hand drum LD immediately under a backing comprising a plate 51 secured to the vertical back panel 42 by means of screws 52, a section 53 fast to the drum mount 37 and an intermediate wedge-shaped section 54 having tongues 55 fitting into grooves in the parts 51 and 53. Extending upwardly from the top of the wedge-shaped section 54 is a lug 56 through which a screw 57 threads into a boss 58 in the back plate 42. Interposed between the lug 56 and the head of the screw 57 is a spring 59 which urges the section 54 against the section 53. As the drum mount 37 slides to the right on the balls 40 the section 54 slides along the edge of the section 51 to keep in contact with the section 53. Thus the backing 51—53—54 extends continuously from the periphery of the drum RD to the drum LD. As shown in Fig. 2 a cleaning pad 60 mounted in a bracket 61 presses upwardly against the face of the belt B which in turn presses against the backing 51—54.

As shown in Fig. 6 the belt B comprises a thin metallic ribbon having holes therein, like sprocket holes in a film, to receive the shanks of pins 62 having heads 63 seating against the back of the belt, the pins being soldered or otherwise secured in the belt. As shown in Figs. 3 and 6 the rubber ring 30 has annular recesses at its opposite sides to accommodate the heads of the pins in the belt.

Referring particularly to Figs. 4 and 6 the seating rolls R each comprises inner and outer peripheral rings 64 and 65 secured to the body of the rollers by means of screws 66, the inner ring 64 being opposite the teeth 62 of the belt and being notched at intervals corresponding to the pitch of the belt teeth to accommodate the projecting ends of the teeth (Fig. 6). Each roll R is mounted on a rocker arm 67 through the medium of a shaft 68, the rocker arm being pivotally mounted on the back plate 42 by means of a shaft 69. The opposite end of the rocker arm 67 (the right-hand end in Fig. 4) is provided with a cup-shaped recess 70 to receive one end of a compression spring 71, the other end of which seats in a cup-shaped lug 72 fast to the back plate 42. Journaled in the back plate on the side of the rocker arm opposite the lug 72 is an eccentric 73 which engages the upper side of the right-hand end of the rocker arm 67 (Fig. 2) to rotate the rocker arm about the pivotal support 69 in the direction to move the seating roll R away from the belt, thereby to facilitate removal of the belt from the machine. Each of the four seating roll assemblies at the four corners of the machine are alike and as shown in Fig. 7 each of the lugs 72 is provided with a threaded cap 74 to permit the removal of the spring 71 and a spring detent 75 is provided to hold the eccentric 73 in normal position.

Referring particularly to Figs. 3 and 5 the tension roll 17 for the negative film N is pivotally mounted on an arm 76 which is mounted on the end of the shaft 77 extending through a bushing 78 mounted in an opening in the back plate 42, the bushing having a flange at the forward end which is secured to the back plate by means of two screws as shown in Fig. 2. The bushing also carries a pin 79 for engagement with a lug 80 on the arm 76 to limit rotation of the arm about shaft 77 in the direction to tension the film. As shown in Fig. 5 the arm 76 is yieldingly urged in the direction to tension the film by means of a plunger 81 sliding back and forth in a cylinder 82 which contains a compression spring such as shown at 83 in Fig. 7. The other tension rollers 2, 3, 9, 10 and 18 are similarly constructed.

As shown in Figs. 3 and 5 the tension roller 17 has a flange 84 at one side to engage the edge of the film but at the other side the film projects beyond the roller into engagement with a roller 85 rotatably supported in an L-shaped arm 86 which is pivotally mounted at 87. The other end of the arm carries a spring contact 88 for engagement with a stationary contact 89, a spring 90 pressing the roller 85 against the edge of the film and tending to close the contacts 88 and 89. When a notch at the edge of the film reaches the roller 85 the roller snaps into the notch and closes the contacts 88—89, thereby operating a signal or a light changer or other suitable apparatus in accordance with well known practice.

As shown in Fig. 7 a detector 91 may be associated with the rolls 7 and 12 to operate a signal or stop the machine when the sound negative S breaks. This device comprises an arm 92 pivoted at 93 and carrying a contact 94 which is normally held in contact with a stationary contact 95 against the action of spring 96 by means of a roller 97 journaled in the arm 92. So long as a film is passing over the roll 7 the roll 97 holds the contacts 94 and 95 in engagement but when the film breaks the contacts move apart to operate a signal or stop the machine. If desired a similar detector may be associated with each of the other two films.

Inasmuch as the four sprocket wheels W are positively driven and inasmuch as the drums LD and RD are driven only by the film, the tension on the stretches of film between the sprocket wheels is controlled solely by the tensioning devices 2, 3, 9, 10, 17 and 18 and is entirely independent of the drag of the supply reels 1, 5 and 15 and of the pull of the take-up reels 4, 14 and 20. Thus as frictionally driven take-up reels increase in diameter the decreasing pull resulting from increase of radius has no effect upon the stretches of film passing to and from the belt. By making the pitch of the teeth on the belt somewhat greater than the pitch of the sprocket holes of the films and by stretching the films until the sprocket hole pitch is approximately equal to or slightly greater than that of the belt teeth, the films may be fed smoothly and uniformly to and from the belt without danger of injuring the films and with minimum wear on the sprocket holes and belt teeth. Inasmuch as the tensioning devices 2, 9 and 17 tend to pull the belt in a counterclockwise direction about its orbit (Fig. 1) and tensioning devices 3, 10 and 18 tend to pull the belt in a clockwise direction about its orbit, three of the devices are balanced against the other three. When using a film which is shrunken more than usual the tension of the two devices associated with that particular film may be increased in any suitable way, as by substituting stronger springs, so that the film is stretched somewhat more than usual, thereby causing the shrunken film to function as smoothly and uniformly as normal films.

It should be understood that the present disclosure is for the purpose of illustration only and that this invention includes all modifications and equivalents which fall within the scope of the appended claims. For example, the subject-matter of the present invention may be used for imbibition printing as disclosed in the application of Gerald F. Rackett, Serial No. 340,120, filed June 12, 1940.

I claim:

1. Cinematographic apparatus comprising a film carrier having an endless series of teeth for engagement in register holes of the film, means for guiding the carrier for movement of the teeth along an orbital path, means for feeding film to and from the carrier, at spaced locations along said path, including film drivers at points spaced from the carrier, one driver engaging the film as it approaches the carrier and the other driver engaging the film as it leaves the carrier, and means for actuating said drivers in synchronism, said carrier being free to be driven by the film, whereby the film feeds freely to and from the carrier.

2. Cinematographic apparatus comprising a film carrier having an endless series of teeth for engagement in register holes of the film, means for guiding the carrier for movement of the teeth along an orbital path, means for feeding film to and from the carrier, at spaced locations along said path, including film drivers at points spaced from the carrier, one driver engaging the film as it approaches the carrier and the other driver engaging the film as it leaves the carrier, means for actuating said drivers in synchronism, and film tensioning means between the carrier and one of said drivers, said carrier being free to be driven by the film, whereby the film feeds freely to and from the carrier with uniform tension.

3. Cinematographic apparatus comprising a film carrier having an endless series of teeth for engagement in register holes of the film, means for guiding the carrier for movement of the teeth along an orbital path, means for feeding film to and from the carrier, at spaced locations along said path, including film drivers at points spaced from the carrier, one driver engaging the film as it approaches the carrier and the other driver engaging the film as it leaves the carrier, means for actuating said drivers in synchronism, and film tensioning means between the carrier and each of said drivers, said carrier being free to be driven by the film, whereby the film feeds freely to and from the carrier with uniform tension.

4. Cinematographic apparatus comprising a film carrier having an endless series of teeth for engagement in register holes of the film, means for guiding the carrier for movement of the teeth along an orbital path, means for feeding film to and from the carrier, at spaced locations along said path, including sprocket wheels for driving the film at points spaced from the carrier, one wheel meshing with the film as it approaches the carrier and the other wheel meshing with the film as it leaves the carrier, kinematic means positively interconnecting said wheels for synchronous rotation, and film tensioning means between the carrier and each of said wheels, said carrier being free to be driven by the film, whereby the film feeds freely to and from the carrier with uniform tension.

5. Cinematographic apparatus comprising a film carrier having an endless series of teeth for engagement in register holes of the film, means for guiding the carrier for movement of the teeth along an orbital path, means for feeding a plurality of films to and from the carrier, at spaced locations along said path, including drivers for positively driving each film at points spaced from the carrier at opposite ends of the portion seated on the carrier, and means for actuating said drivers in synchronism, said carrier being free to be driven by the films, whereby the films feed freely to and from the carrier.

6. Cinematographic apparatus comprising a film carrier having an endless series of teeth for engagement in register holes of the film, means for guiding the carrier for movement of the teeth along an orbital path, means for feeding a plurality of films to and from the carrier, at spaced locations along said path, including drivers for positively driving each film at opposite ends of the portion seated on the carrier, means for actuating said drivers in synchronism, and film tensioning means between the carrier and one of said drivers along each film, said carrier being free to be driven by the films, whereby the films feed freely to and from the carrier with uniform tension.

7. Cinematographic apparatus comprising a film carrier having an endless series of teeth for engagement in register holes of the film, means for guiding the carrier for movement of the teeth along an orbital path, means for feeding a plurality of films to and from the carrier, at spaced locations along said path, including drivers for each film at opposite ends of the portion seated on the carrier, means for actuating said drivers in synchronism, and film tensioning means between the carrier and each of said drivers, said carrier being free to be driven by the films, whereby the films feed freely to and from the carrier with uniform tension.

8. Cinematographic apparatus comprising a film carrier having an endless series of teeth for engagement in register holes of the film, means for guiding the carrier for movement of the teeth along an orbital path, means for feeding a plurality of films to and from the carrier, at spaced locations along said path, including sprocket wheels for driving each film at opposite ends of the portion seated on the carrier, kinematic means positively interconnecting said wheels for synchronous rotation, and film tensioning means between the carrier and each of said wheels, said carrier being free to be driven by the films, whereby the films feed freely to and from the carrier with uniform tension.

9. Cinematographic apparatus comprising two aligned drums, an endless belt trained over the drums, the belt having outwardly projecting teeth for engagement in the sprocket holes of perforated film, means for feeding a plurality of films to and from the belt, with portions of the films seated on the belt over said teeth, including drivers for positively driving each film at points spaced from the belt at opposite ends of the portion seated on the belt, means for actuating said drivers, in synchronism, and film tensioning means between the belt and one of said drivers along each film, said belt and drums being free to be driven by the films, whereby the films feed freely to and from the belt with uniform tension.

10. Cinematographic apparatus comprising two aligned drums, an endless belt trained over the drums, the belt having outwardly projecting teeth for engagement in the sprocket holes of perforated film, means for feeding a plurality of films to and from the belt, with portions of the films seated on the belt over said teeth, including drivers for positively driving each film at points spaced from the belt at opposite ends of the portion seated on the belt, means for actuating said drivers in synchronism, and film tensioning means between the belt and each of said drivers, said belt and drums being free to be driven by the films, whereby the films feed freely to and from the belt with uniform tension.

11. Cinematographic apparatus comprising two aligned drums, an endless belt trained over the drums with straight stretches therebetween, the belt having outwardly projecting teeth for engagement in the sprocket holes of perforated film, means for feeding a plurality of films to and from said straight stretches of the belt, with portions of the films seated on the belt over said teeth, including drivers for positively driving each film at points spaced from the belt at opposite ends of the portion seated on the belt, means for actuating said drivers in synchronism, and film tensioning means between the belt and each of said drivers, said belt and drums being free to be driven by the films, whereby the films feed freely to and from the belt with uniform tension.

12. Cinematographic apparatus comprising two aligned drums, an endless belt trained over the drums with straight stretches therebetween, the belt having outwardly projecting teeth for engagement in the sprocket holes of perforated film, means for feeding a plurality of films to and from the belt, with portions of the films seated on the belt over said teeth, including sprocket wheels for positively driving each film at points spaced from the belt at opposite ends of the portion seated on the belt, kinematic means positively interconnecting said wheels for synchronous rotation, and film tensioning means between the belt and each of said wheels, said belt and drums being free to be driven by the films, whereby the films feed freely to and from the belt with uniform tension.

13. Cinematographic apparatus comprising two aligned drums, an endless belt trained over the drums, the belt having outwardly projecting teeth for engagement in the sprocket holes of perforated film, means for feeding two films to and from the belt, with portions of the films superposed on the belt over said teeth, including a driver for positively driving both films at a point spaced from the belt, and means for independently tensioning each film between the carrier and said driver.

LLOYED E. WHITTAKER.